United States Patent [19]
Siegel et al.

[11] Patent Number: 5,073,852
[45] Date of Patent: Dec. 17, 1991

[54] NETWORK PROTOCOL TRANSLATOR INCLUDING METHOD AND APPARATUS FOR REDUCING INTERPROCESS COMMUNICATION AND DATA EXCHANGE OVERHEAD

[75] Inventors: Kenneth P. Siegel, Nashua, N.H.; J. Bradford Parker, Somerville; John Wroclawski, Brookline, both of Mass.

[73] Assignee: Cayman Systems, Inc., Cambridge, Mass.

[21] Appl. No.: 285,761

[22] Filed: Dec. 16, 1988

[51] Int. Cl.⁵ .................. G06F 15/16; G06F 13/00
[52] U.S. Cl. ............................. 395/700; 364/284; 364/284.1; 364/284.3; 364/284.4; 364/260; 364/260.1; 364/280; 364/280.6; 364/240.8; 364/241.7; 364/241.8; 364/919; 364/926.9; 364/926.12; 364/927.96; 364/963; 364/963.3; 364/963.2; 364/976; 364/DIG. 1; 364/DIG. 2; 364/927.98

[58] Field of Search ... 364/200 MS File, 900 MS File

[56] References Cited

U.S. PATENT DOCUMENTS

| 4,333,144 | 6/1982 | Whiteside | 364/200 |
|---|---|---|---|
| 4,437,184 | 3/1984 | Cork | 364/200 |
| 4,447,874 | 5/1984 | Bradley | 364/200 |
| 4,509,851 | 4/1985 | Ippolito | 364/200 |
| 4,590,551 | 5/1986 | Mathews | 364/200 |
| 4,590,551 | 5/1986 | Matthews | 364/200 |
| 4,694,396 | 9/1987 | Weisshaar | 364/200 |
| 4,706,081 | 11/1987 | Hart | 370/61 |
| 4,731,750 | 3/1988 | Hoflich | 364/900 |
| 4,736,368 | 4/1988 | Szczepanek | 370/89 |
| 4,747,130 | 5/1988 | Ho | 364/200 |
| 4,796,178 | 1/1989 | Jennings | 364/200 |
| 4,823,304 | 4/1989 | Frantz | 364/200 |
| 4,831,518 | 5/1989 | Yu | 364/200 |
| 4,835,685 | 5/1989 | Kun | 364/200 |
| 4,845,609 | 7/1989 | Lighthart | 364/200 |
| 4,855,905 | 8/1989 | Estrada | 364/200 |
| 4,864,532 | 9/1989 | Reeve | 364/900 |
| 4,914,583 | 4/1990 | Weisshaar | 364/200 |
| 4,956,772 | 9/1990 | Neches | 364/200 |

OTHER PUBLICATIONS

Operating System Concepts by J. L. Peterson and A. Silberschatz, Addison Wesley Pub. Co. 1983, p. 329.

*Primary Examiner*—Thomas C. Lee
*Assistant Examiner*—Eric Coleman
*Attorney, Agent, or Firm*—Wolf, Greenfield & Sacks

[57] ABSTRACT

An method for interprocess communication and data exchange within a computer's software operating system executing on a computer network protocol translator having a central processing unit and associated memory, which includes encapsulating the message or data to be exchanged within certain header and footer information which defines the context of the transmission. Certain program routines are executed in conjunction with this context information which enable the software processes within the operating system to exchange data and to acknowledge the receipt of messages without having to generate and transmit return messages or pre-empt the operating system's execution sequence.

2 Claims, 6 Drawing Sheets

NETWORK PROTOCOL TRANSLATOR INCLUDING METHOD AND APPARATUS FOR REDUCING INTERPROCESS COMMUNICATION AND DATA EXCHANGE OVERHEAD

BACKGROUND OF THE INVENTION

1. Field of the Invention

The present invention relates generally to the field of computer network protocol translators. In particular, the present invention concerns an improved method for interprocess communication in a computer operating system that is executing in a computer network protocol translator consisting of at least a central processing unit and associated memory. The present invention further concerns an improved method of interprocess communication and data exchange for use in network protocol translators.

2. Description of the Prior Art

In the field of computer networks, there are a plurality of different types of networks used to connect individual computers together so that they may exchange data. There has always been a need to be able to allow computers which are connected on separate, disparate types of networks to communicate and exchange data. Communication between computers on separate disparate networks is accomplished by network protocol translators, which translate between the differing hardware circuitry and software protocols of the disparate networks.

A software operating system that is executing on a computer network protocol translator may be thought of as a resource allocator and manager. The main functions of such a software operating system are:

(a) to provide a mechanism for the creation and deletion of processes;
(b) to provide CPU scheduling, memory management and device management for these processes;
(c) to provide synchronization tools, so that the processes can coordinate their actions; and
(d) to provide communication tools, so that the processes can exchange information with each other.

Therefore, the system's software may be viewed as a set of software processes whose actions are coordinated and facilitated by the operating system.

In order to facilitate interprocess communication and data exchange within the operating system, many modern computer systems use some form of a messaging system. The function of a messaging system is to allow software processes to communicate and to exchange data with each other. In one implementation of prior art messaging systems, an interprocess communication facility basically provides two operations, SEND (MESSAGE) and RECEIVE (MESSAGE). For example, if two processes, (A) and (B), want to communicate, they must send and receive messages from each other. That is, process (A) must generate and send a message that is received by process (B). Process (B) then has to acknowledge the receipt of the message by generating and sending a message back to process (B).

The above example illustrates one of the limitations of the prior art messaging systems. That is, in order for processes to communicate, at least two messages must be generated and exchanged between the processes. This type of "query-response" protocol requires that the system generate and keep track of which messages have and have not been acknowledged. Keeping track of acknowledgements through the use of mechanisms such as transaction identification numbers requires additional processing overhead and software complexity.

Another implementation of the prior art message passing system uses pre-emptive or interrupt-driven software In these message passing systems, a scheduling mechanism is used to apportion central processing unit time to different processes in order to use the central processing unit most efficiently. Adding this type of pre-emptive scheduling to an operating system adds additional overhead and thus reduces the achievable system performance.

Another characteristic of some prior art message passing systems is that the messages are generally copied from one memory area to another as control of the message is transferred from the sending software process to the receiving software process. This type of messaging system uses additional memory and also limits the system performance because of the time required to copy a complete message from one memory area to another.

In view of the foregoing limitations, an object of the present invention is to eliminate the need to generate a return acknowledgement message in response to a transmitted message in a computer network protocol translator.

Another object of the present invention is to eliminate the need to cop messages from one data area to another in a computer network protocol translator.

Another object of the invention is to be able to return the status of the message processing and responses to software processes that request status and response in a computer network protocol translator, without having to generate and send a response message.

A further object of the present invention is to improve a computer network protocol translator system s performance by eliminating the additional system overhead which would be required by using a pre-emptive scheduling technique or a "query-response" messaging protocol.

SUMMARY OF THE INVENTION

To accomplish the foregoing and other objectives, there is provided an improved method for transmitting messages and receiving responses between software processes in a software operating system executing on a computer network protocol translator, allowing data to be exchanged by the various processes in the operating system. In order to send messages from one software process to another without having to physically copy the message from one data area to another, the present invention assigns an address to each process in the operating system which is to receive messages. This address forms the primary entry point which is unique to each process.

Next, the system software assigns blocks of memory known as "event records", in which the messages are stored in the system. Each event record in the system has its own unique address in the memory. In order to transmit the message from the sending software process to the receiving software process, the present invention "posts" the message to a process control data structure which is maintained and controlled by the operating system. Messages are placed in a queue in the process control data structure. When the operating system scheduler gets access to the central processing unit, the messages are sequentially, in conjunction with the message priority and order in which they were queued, removed from the service control block and delivered to the receiving software process. Delivery of a message is accomplished by calling the receiving process's primary entry point address and sending the address of the message to the receiving processes primary entry point. Therefore, the operating system does not have to copy the message itself from one data area to another.

In order to allow the receiving software process to acknowledge receipt of the message and to send back the results of its processing of the message, the present invention assigns an additional memory area to the end of the event record containing the message. In this additional "footer" memory area are stored a completion routine address and other context information, such as address pointers which reflect the state of the processed message. The present invention allows each software process which requires information concerning the outcome of the processing of the message to add its own footer to the event record. After a software process has added a footer containing a completion routine address and context information to the event record, it may then post the message to the next required software process, in order to complete processing of the message. The present invention provides for chaining of the footers and completion routines in an event record. Each process which requires information about the status of the message may add its own footer to the event record.

The present invention further provides that when the message is finished being processed, the software kernel calls the completion routine address contained in the last footer that was appended onto the event record. Depending on the outcome of the message processing, the completion routine when executed, will return a "release" parameter if the message was processed successfully, or a "hold" parameter if it was not. The system next checks to see what parameter was returned by the completion routine. If "hold" had been returned, then none of the remaining completion routines are called, and the event record is held for further processing by the process whose completion routine returned the "hold" parameter. If the "release" parameter is returned, on the other hand, the system checks to see if there are any remaining footers appended to the event record. If there are additional footers, the system calls the completion routine contained in the last footer, and the processing repeats. Therefore, the system unwinds the message footers which have been appended to the event record, so that the status of the original transmitted message may be returned to the originating software process.

Finally, when the system determines that there are no more completion routines to process, the system disposes of the event record, which results in the memory being returned to the computer system memory for reuse.

BRIEF DESCRIPTION OF THE DRAWING

Numerous other objects, features, and advantages of the present invention should now become apparent upon a reading of the following detailed description taken in conjunction with the accompanying drawing in which:

FIG. 3 illustrates the flow of an Appletalk file write request from an Appletalk network through the network protocol translator messaging system of the present invention to become a file write request on a separate network file system (NFS) server; FIG. 4 illustrates the flow of a message acknowledgement to the Appletalk file write request of FIG. 3 through the network protocol translator messaging system of the present invention.

DETAILED DESCRIPTION OF THE INVENTION

Figure 1:
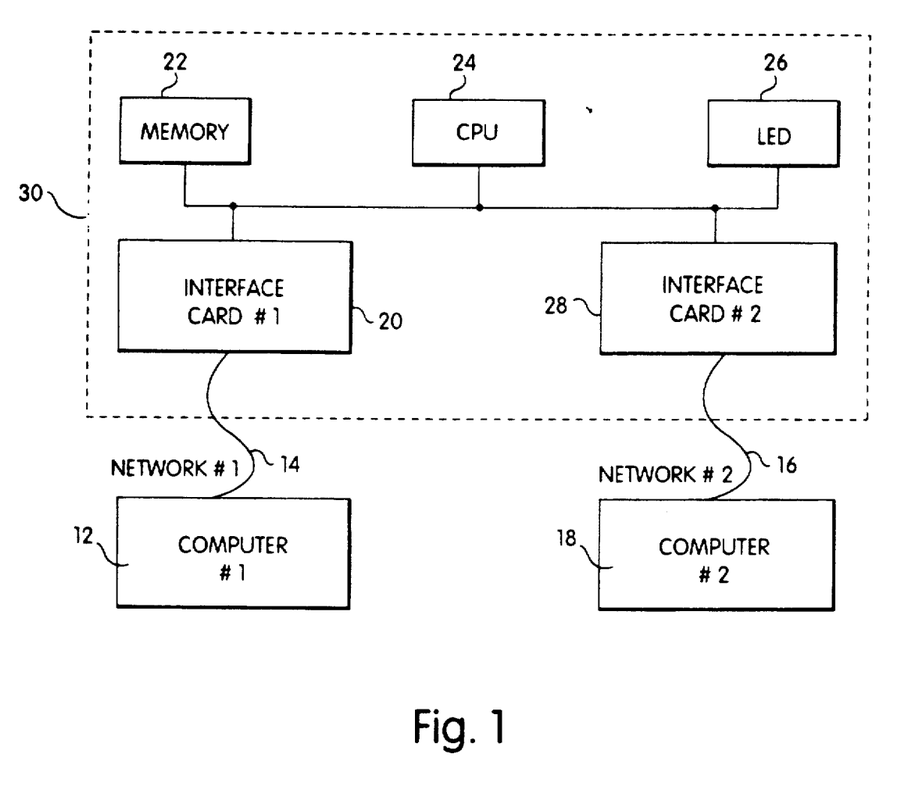
FIG. 1 is a schematic block diagram of a network protocol translator which embodies the present invention.

Reference is now made to FIG. 1, which is a schematic block diagram of a network protocol translator employing the present invention. The network protocol translator 30 contains at least some memory 22 (which may be dynamic RAM), a central processing unit 24 such as a Motorola 68000 microprocessor, and indicators 26 which show the user the status of the operation of the network protocol translator. Such indicators may be light emitting diodes. The network protocol translator 30 further contains interface cards 20 and 28 embodying circuitry to interface to the respective networks for receiving and transmitting signals. These interface cards are connected by suitable connectors to the networks 14 and 16. In general, these networks are of different types. For example, network 14 may be an ethernet network, and network 16 may be an Appletalk network (Trademark of Apple Computer, Inc., Cupertino, Calif.). Network cables 14 and 16 are further connected to computers 12 and 18, respectively. These computers may be of different types and may be executing different software. The components of the network translator 30 are further connected together by system bus 32, which allows the different components of the network protocol translator to exchange information and to communicate with each other.

Figure 2:
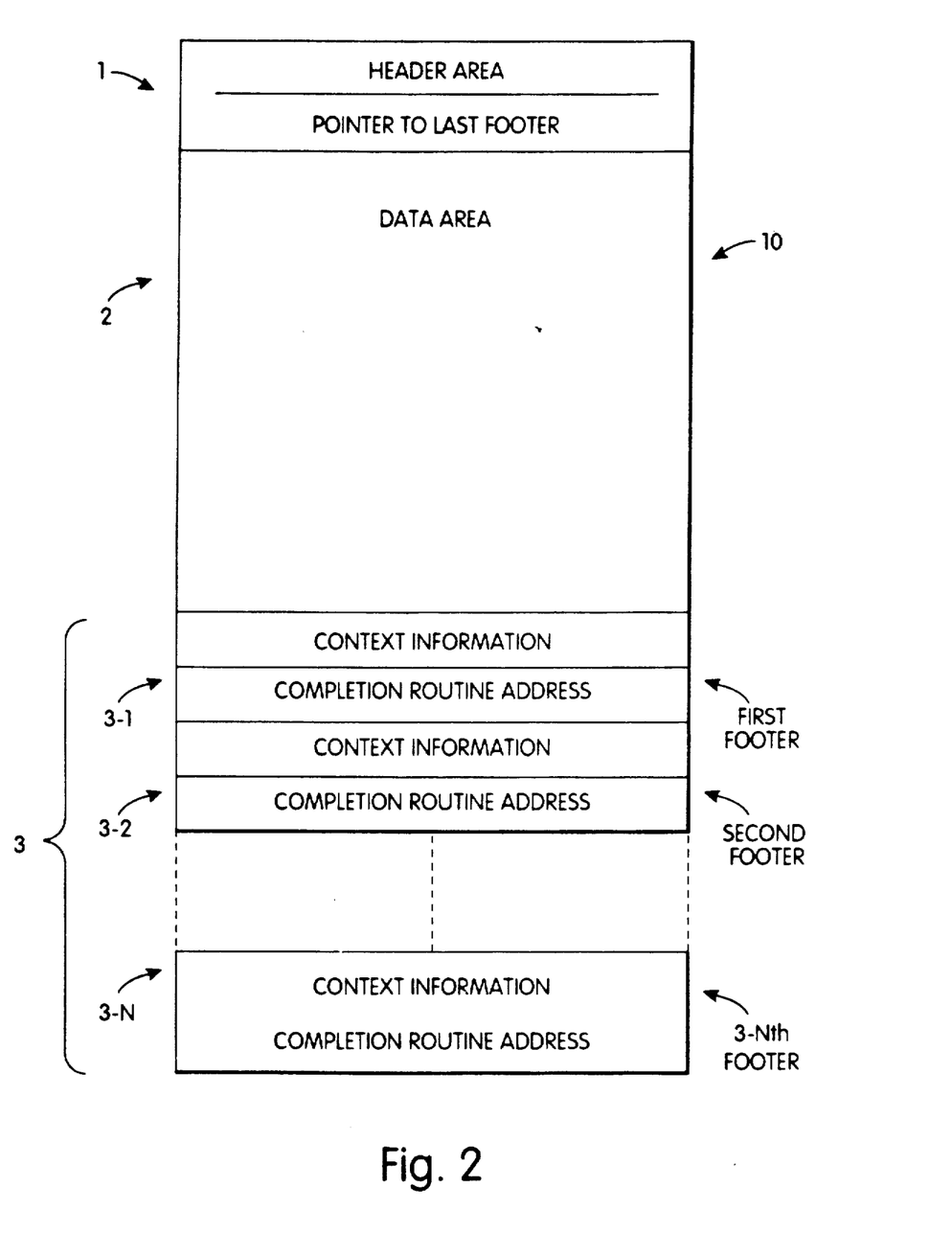
FIG. 2 is a diagrammatic illustration of a memory map showing the structure of an event record of the present invention.

Reference is now made to FIG. 2, which depicts a memory map 10 showing the structure of a message according to the present invention. This block of memory 10, which contains a message and other information concerning the message, is called an event record. The event record is the fundamental unit of information transfer between software processes in the present invention. The first part of the event record 10 is the header area 1 used by the system software kernel to control message dispatching. The header area also contains a pointer that points to the address of the last footer which has been appended onto the event record. Also included in the header area is a status field that contains the results of the message processing. This status may be error codes or the like that return the outcome of the message processing to the software process that originally transmitted the message. The header area 1 in the event record 10 also contains information needed to communicate the type of message to the receiving software process which will be processing the message.

The second part of the event record 10 is the data area 2 which contains the actual information which will be processed by the receiving software process. The third part of the event record is a footer area 3 which is appended onto the end of the data area 2. The first footer 3-1 contains a completion routine address and may also contain context information, such as a pointer or status information. The footer may be appended onto the event record by any software process that requires notification of the status of, or a response back from, the receiving software process. Footers 3-1, 3-2 ... 3-n are sequentially appended to the event record by each software process that requires notification of the status of the processing of the message, or a response back from the software process which processed the message.

Figure 3:
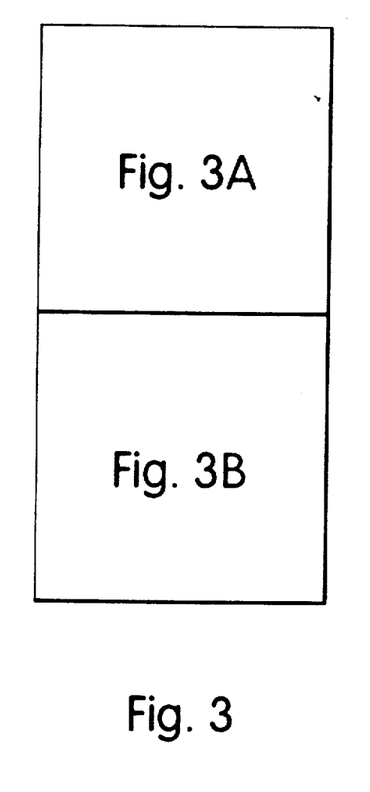
FIG. 3 which comprises 3A and 3B is a flow chart illustrating the flow a of message from one network to another separate and distinct network through the network protocol translator messaging system of the present invention. In particular.
Figure 3A:
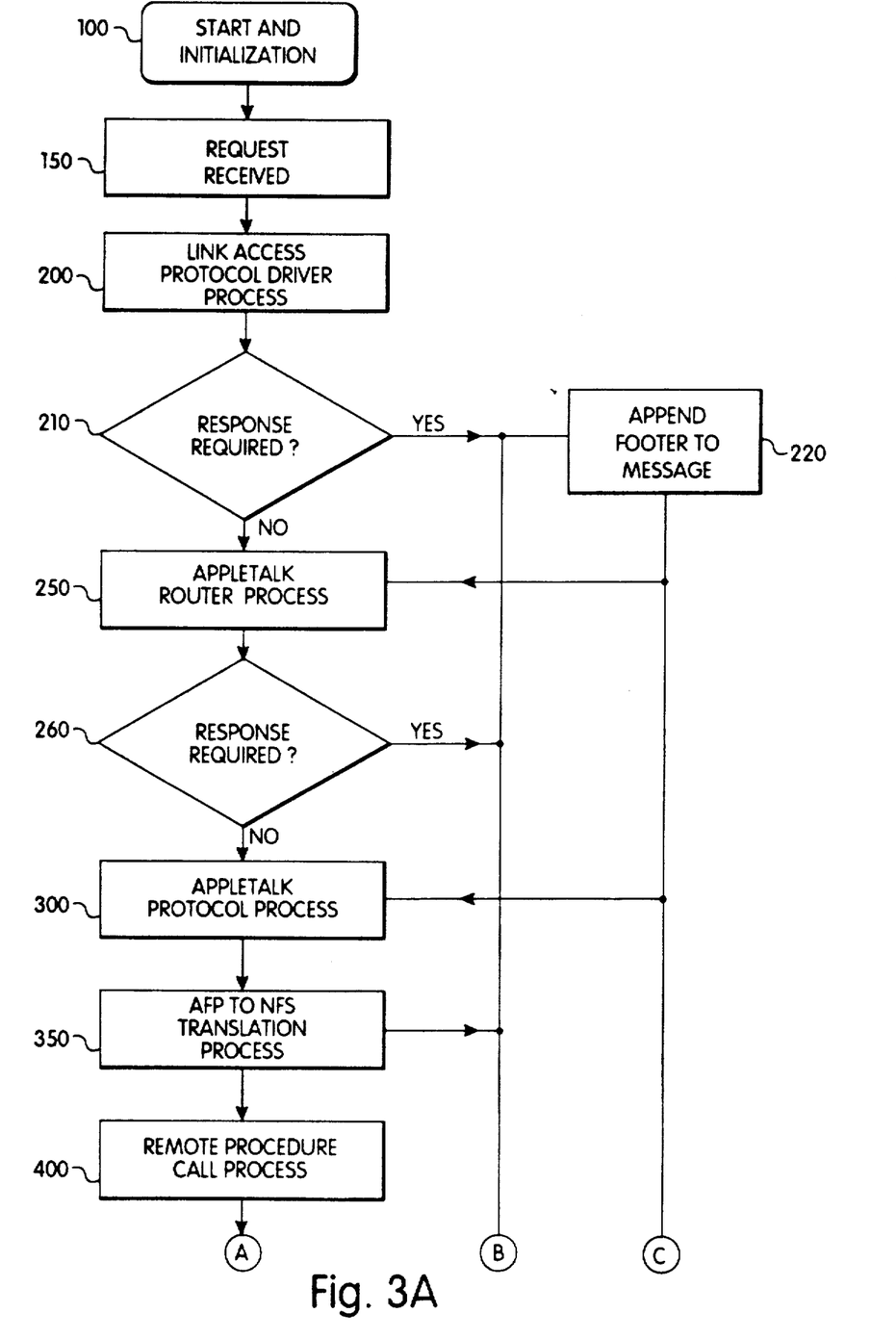
Figure 3B:
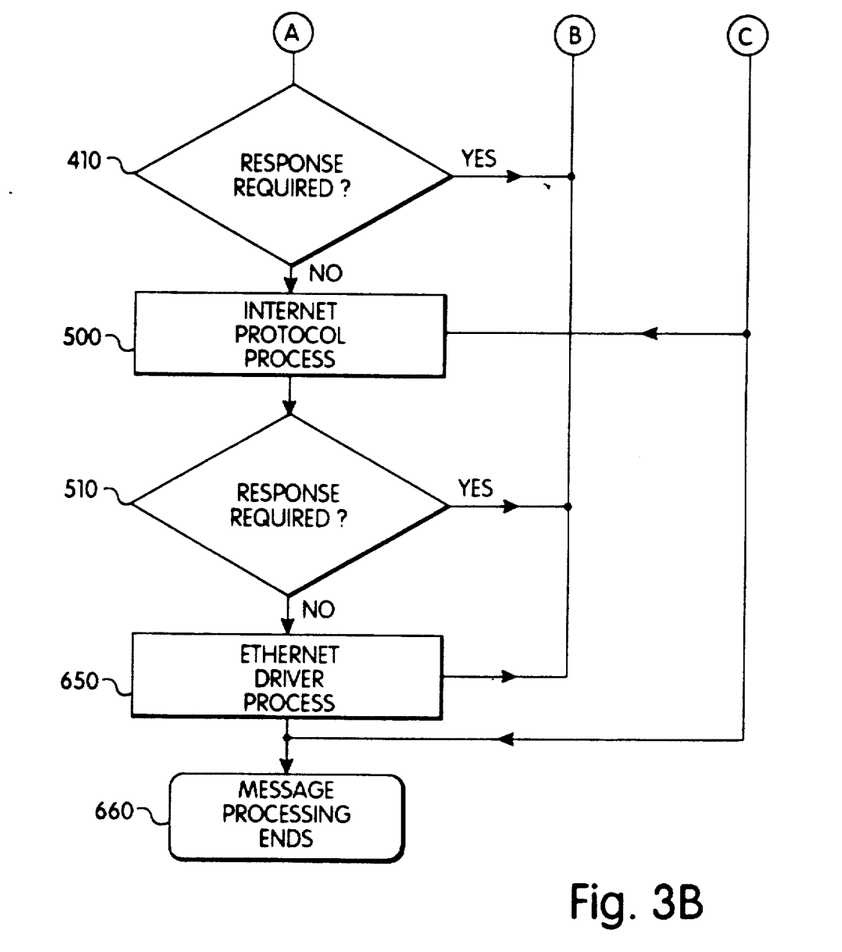
Figure 4:
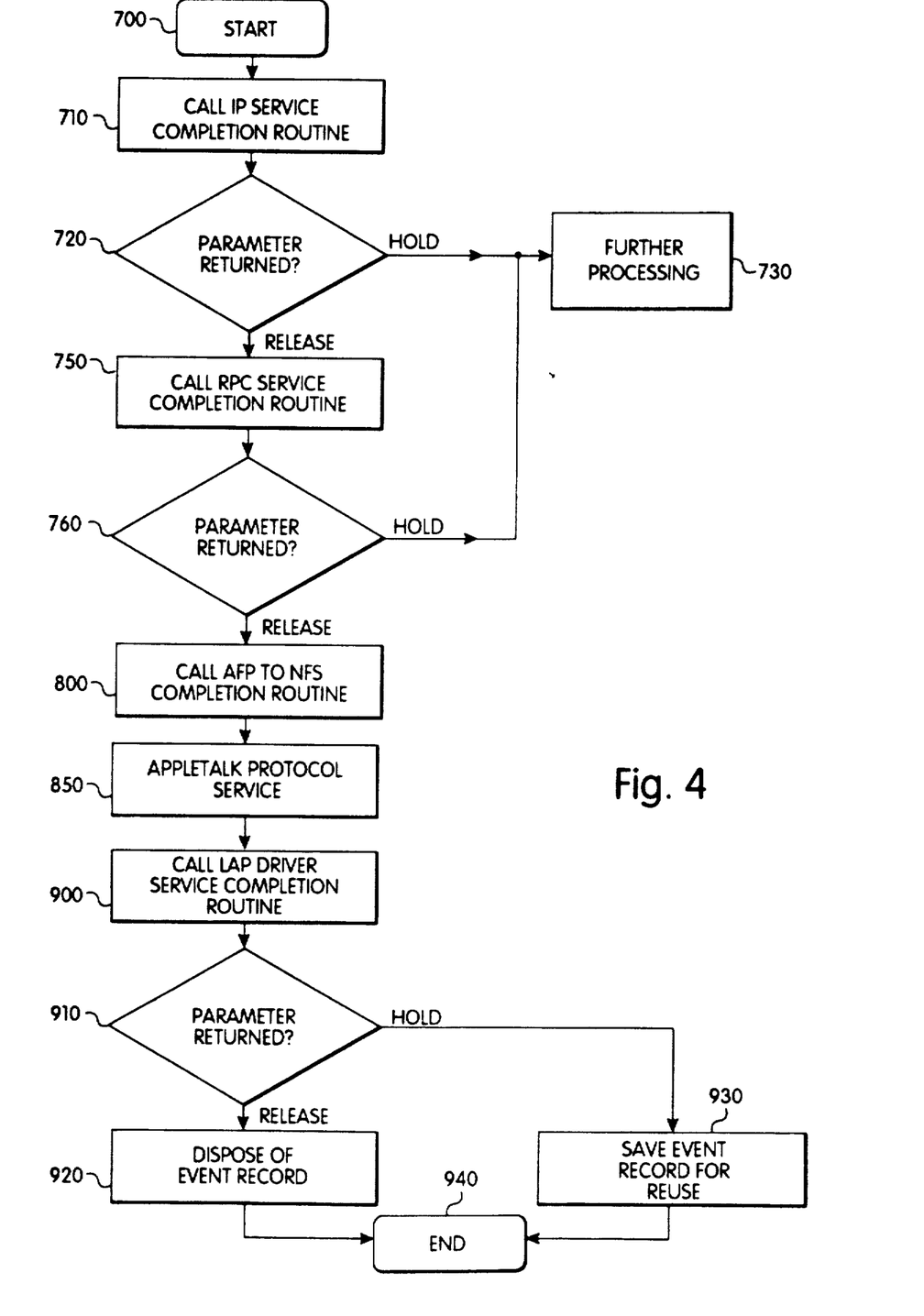
FIG. 4 is a flow chart illustrating the flow of a message acknowledgement from one network to another separate and distinct network through the network protocol translator messaging system of the present invention. In particular.

Reference is now made to FIGS. 3 and 4, which are flow charts indicating how a typical event record message will be transmitted and processed through the operating system by the method and apparatus of the present invention. For exemplary purposes only, and not to limit the generality of the present invention, network 14, as shown in FIG. 1, will be considered to be an Ethernet network and network 16, as shown in FIG. 1, will be considered to be an Appletalk network. In this context, the translation of an Appletalk file write request to a write request on a remote network file system (NFS) (a specification of Sun Microsystems, Inc., Mountain View, Calif.) will now be described. Of course, it is to be appreciated that the method and apparatus of the present invention may be applied to other types of networks and to other types of network operations. FIG. 3 depicts the flow of an Appletalk file write request through the operating system to become a write request on a remote network file system (NFS) server. FIG. 4 depicts the flow of an acknowledgement of the Appletalk file write request as processed through the messaging system of the present invention.

Beginning with FIG. 3, step 100, the operating system initializes the various software processes which are to receive messages by assigning a unique address to each process. This address forms the primary entry point for each process and allows access to each process. In step 150 of FIG. 3, a request to write a block of data to a file comes into the system from a remote system such as the Appletalk network described in FIG. 1. In this example, the write request is an Appletalk file write request which is to be transmitted to a remote network file system (NFS) server with an acknowledgement of the request sent back. A hardware interrupt is generated in the computer system which causes the operating system program to activate module 200. Software module 200 is called a link access protocol (LAP), which is a conventional software routine that clocks in all the bytes of data from the Appletalk network interface that make up the incoming data packet, and stores them in a buffer.

When the transmission of data is completed and all the data has been received, the LAP driver allocates a kernel event record, as shown in FIG. 1, in order to store the transmitted message. The LAP driver process next moves to step 210, in which it determines whether a response to the message is required. If the answer in step 210 is determined to be "no", then the LAP driver will post the message directly to the Appletalk router process 250. "Posting" a message is accomplished by calling a software kernel routine that queues the message to a process control data structure that is maintained and controlled by the operating system. When the operating system scheduler gets access to the central processing unit, the message is delivered to the Appletalk router process 250 by calling the receiving process's primary entry point address, in this case, the address of the Appletalk router process dequeueing the message from the process control data structure, and then transmitting the address of the message to the receiving process's primary entry point. In this manner, the operating system does not have to copy the message or transmit the message from one data area to another.

If, on the other hand, the answer in step 210 is "yes", that is, a response to the message is required, then the process flow proceeds to step 220. In step 220, the LAP driver process would append a footer to the event record as shown in FIG. 1. This footer would contain at least some context information, such as an address pointer which would point back to a LAP driver data structure, and a completion routine address. When the completion routine is executed in conjunction with the context information, the system is able to return the status of the message to the LAP driver process without being required to generate a new message and then transmit the message back to the LAP driver process.

From step 220, the event record with its first appended completion routine is posted and delivered to the Appletalk router process 250. The Appletalk router process 250 reads the destination address of the event record packet, in order to determine to which node it is addressed. Once the Appletalk router process 250 determines that its address and the network destination address of the event record match, the Appletalk router process will accept the posted event record for passage to other layers of the Appletalk protocol. In the next step 260, the Appletalk router process determines if it requires a response to the received message. The Appletalk router process 250 is a software process which does not require a response to the message and, therefore, it does not append a footer to the event record. The Appletalk router software process immediately posts the event record to the Appletalk protocol process module 300. This module determines that the received event record is an Appletalk filing protocol request.

The AFP (Appletalk filing protocol) to NFS (network file system) translation process 350 is the module responsible for handling incoming AFP requests. During the system initialization process, the AFP to NFS translation 350 process sent a message to the Appletalk protocol process 300 encoded with an event record which requested notification of any AFP requests that came into the system. Since the AFP to NFS translation process requires notification of any AFP requests which come in, it had appended a footer to the event record which it had sent to the Appletalk protocol process. This footer contained context information pointing to data structures used by the AFP to NFS translation process 350 and a completion routine address which would cause the operating system to call the AFP to NFS translation process when this completion routine was executed. In response to this message, the Appletalk protocol process 300 inserts a pointer pointing to the address of the event record it has just received from the Appletalk router process 250 in the context area of the footer of the event record it had previously received from the AFP to NFS translation process. The Appletalk protocol process then calls the completion routine address which causes the operating system to call the AFP to NFS translation process.

The AFP to NFS translation service 350, which now has the address of the event record that was received by the Appletalk protocol process 300, determines what type of request it has received. In the example, the AFP to NFS translation process determines that this is a file write request. The AFP to NFS translation module then allocates a new event record and appends a footer to it in step 220. In this footer area is stored a completion routine address and context information, which in this case is the address of a context block containing the address of the event record it received from the Appletalk protocol process 300. The AFP to NFS translation process allocates a new event record because the nature of an NFS write request is different from an Appletalk write request. The AFP to NFS translation process will reuse the original received event record to send a response back to the Appletalk protocol process 300 by calling the completion routine address that had been stored in the footer appended to the event record. The AFP to NFS translation service then posts the new event record it has created to the remote procedure call (RPC) process 400.

The RPC 400 process is responsible for formatting requests in such a way that they may be unambiguously processed by a remote network, using a specifically defined software process. This processing includes representing the data in the request in a generic format which all machine types, regardless of their architecture, can process. When the RPC process 400 has completed processing the message, the system determines whether a response or acknowledgement is required in step 410. The RPC process is a software process which does require a response to its message, and therefore the program flow loops back to step 220 and a footer is appended to the event record, such footer containing a completion routine address and context information. This completion routine address and context information will allow the RPC process to retry the remote procedure call if it receives a response back from the next software process indicating that the procedure call failed the first time it was issued. At this point, the RPC process posts the event record to the internet protocol (IP) process 500. The IP process prepares the write request for transmission to a node supporting the NFS protocol. In the next step, 510, the IP process determines whether a response is required to the message. The IP process needs to be notified of the results of the packet transmission. Therefore, the process flow proceeds to step 220 where a footer is appended to the event record after the footer which had been appended to the event record by the RPC process 400. The event record is then posted by the IP process to the ethernet driver process 650 for transmission onto an ethernet physical network. The operating system then proceeds to step 660, in which the message processing ends.

Reference is now made to FIG. 4, which depicts how an acknowledgement or response is sent back to the originating software process with the results of the original Appletalk file write request.

In step 700, the message processing has finished and the operating system software kernel needs to send the results of the message processing back to the software processes that added completion routines to the event record. Since the write request is assumed to have been completed successfully for purposes of the example, the operating system software kernel calls the IP process completion routine 710. The operating system software kernel calls the IP process completion routine by calling the address of the completion routine which had been stored in the footer that had been appended to the event record by the IP process 500 in FIG. 3. When this completion routine is executed in conjunction with the context information that was also in the same footer, the system determines that the write request went out successfully on the ethernet physical network. Therefore, the completion routine returns a "release" parameter which allows the operating system software kernel to call the next previous completion routine which had been appended to the event record. If, on the other hand, in step 720, the parameter returned had been the "hold" parameter, then the processing would have proceeded to step 730, in which the event record would have been held for further processing, such further processing consisting of retrying the failed transmission.

Since the "release" parameter was returned in step 720, this notifies the operating system software kernel to call the next previous completion routine that had been appended to the event record. Therefore, the processing proceeds to step 750 in which the operating system software kernel calls the completion routine which had been stored in the footer that was appended to the event record by the RPC software process. When the RPC process completion routine 750 is executed in conjunction with the context information which had been stored in the footer along with the completion routine address, the system checks to ensure that the write request completed successfully. Since the write request had been completed successfully, there is no need to hold the event record for a retry. Therefore, in step 760, the "release" parameter is returned. If the "hold" parameter had been returned in step 760, then the processing would have proceeded to step 730 for further processing, such as retrying the remote procedure call.

The "release" parameter returned in step 760 will cause the operating system software kernel to proceed to step 450 in which it calls the AFP to NFS translation process completion routine address. The address of the AFP to NFS translation process completion routine and context information had been stored in the footer which was appended to the event record just previous to the footer which had been appended to the event record by the RPC process. When this completion routine is executed in conjunction with the context information in the footer, the routine will return the "release" parameter. Status indicating that the write request which the AFP to NFS translation software process had originally posted to the RPC service in step 350 of FIG. 3 was executed successfully will be stored in the status field of the original event record. Therefore, the AFP to NFS translation software process will dispose of the event record that it issued by returning the memory back to the computer system memory, since there were no other completion routines left to be executed.

Next, the AFP to NFS translation software process will put the result that the write request was completed successfully into the status field of the event record which was originally posted to it by the Appletalk protocol process 300 in FIG. 3. The AFP to NFS translation software process will add a footer to this event record containing a completion routine address and context information which points back to the AFP to NFS translation process. Therefore, when the AFP to NFS translation process posts this message back to the Appletalk protocol process 300, the Appletalk protocol process will be able to notify the AFP to NFS translation software process of another request, merely by executing the completion routine which had been stored in the footer appended to this event record by the AFP to NFS translation process.

The Appletalk protocol process 300, which now has the results of the original write request, will then signal the kernel to call the completion routine address which had been stored in the footer which had been appended to the original event record by the LAP driver software process 200 in FIG. 3. When the LAP driver process completion routine 900 is executed in conjunction with the context information in the footer, the processing will move to step 910 in which the system will determine which parameter, "hold" or "release," has been returned by the completion routine. If the release parameter had been returned, the processing would have moved to step 920, in which the operating system would have disposed of the event record by returning the memory to the computer system for reuse. In this particular example, however, the completion routine returned the "hold" parameter, therefore causing the processing to move to step 930, in which the LAP Driver saves the event record for further processing. In this example, further processing means that this event record can be reused or reallocated to a new Appletalk file write request that may be received at the Appletalk port. Next, the processing moves to step 940, in the which the processing of this particular Appletalk file write request has ended and the system is now waiting for another file write request.

Having thus described one particular embodiment of the invention, various alterations, modifications and improvements will readily occur to those skilled in the art. Such alterations, modifications and improvements as are made obvious by this disclosure are intended to be part of this description through not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for interprocess communication and data exchange within a computer software operating system executing on a computer network protocol translator having a central processing unit and associated memory for storing information, said memory connected to and controlled by at least said central processing unit, which method provides for the exchange of data between software processes executing on said network protocol translator, comprising the steps of:

(a) assigning a unique address in the memory address space for each software process that is to receive a message;

(b) designating said address as the entry point for accessing each software process which is to receive messages;

(c) allocating a portion of the memory in the computer system for storage of a message;

(d) assigning an additional portion of memory to the portion of memory which contains the message;

(e) storing in said additional memory portion a completion routine address and context information;

(f) posting the message by queueing a location of the portion of memory storing the message to a process control data structure in the memory maintained and controlled by the operating system;

(g) delivering the message to a receiving software process by dequeing the message from the process control data structure and transmitting the location in memory of the message to the receiving software process's entry point;

(h) repeating steps (d), (e), (f), and (g) for each software process which receives the posted message and which requires notification of subsequent processing of the message;

(i) sequentially, in the reverse order in which the additional memory portions have been appended to the original memory portion, calling the completion routine's address stored in the last appended memory area by the operating system when a message is finished being processed;

(j) executing said completion routine in conjunction with context information stored in the same additional memory portion;

(k) using a result of the execution of the completion routine to determine whether to call the address of the completion routine stored in the next to the last additional memory portion by the operating system software; and (l) repeating steps (a) through (c) sequentially, until all completion routines in all additional memory portions having been executed, so that the status of the processing of the message is reported back to the originating software process without requiring the receiving software process to generate and transmit a message.

2. A method for interprocess communication and data exchange within a computer network protocol translator as defined in claim 1 which further comprises the steps of:

(a) executing the completion routine whose address was stored in the additional memory portion by the operating system when message processing is finished;

(b) executing said completion routine in conjunction with context information stored in the same additional memory portion; and (c) using a result of the execution of said completion routine to report a status of message processing to an originating software process.

* * * * *